Dec. 16, 1930.  G. LOWENSTEIN  1,785,034

MEANS FOR HANDLING VEHICLES IN GARAGES

Filed Nov. 10, 1927

Inventor
Gothard Lowenstein
By his Attorney

Patented Dec. 16, 1930

1,785,034

UNITED STATES PATENT OFFICE

GOTHARD LOWENSTEIN, OF BROOKLYN, NEW YORK

MEANS FOR HANDLING VEHICLES IN GARAGES

Application filed November 10, 1927. Serial No. 232,298.

This invention relates to improvements in garage equipment, and more particularly refers to improved arrangements for facilitating internal traffic in garages, at the same time affording a maximum efficiency in the use of the storage space.

The primary object of this invention is to provide a novel and improved arrangement of vehicle handling means, adapted for installation in an ordinary garage floor, without requiring any material changes in the structure of the floor itself.

Another object of the invention is to provide a novel and simple combination of carrying and handling means for vehicles, adapted to be installed and operated at relatively low cost, and insuring speedy and safe transit of vehicles to and from the garage entrance and their respective storage places.

A further object is to provide a garage of a novel and improved construction, equipped with means of a relatively simple and inexpensive character, for handling and distributing vehicles on its floors, said means permitting the efficient use of the storage space provided on said floors.

Other objects and advantages of the present invention will more fully appear as the description proceeds and will be set forth and claimed in the appended claims.

In order to enhance the efficient operation of a garage, it is desirable to improve certain conditions which generally exist in garages of the usual type. It is, of course obvious that a maximum utilization of the floor space for storage purposes should be obtained in order to increase the revenue derived from the rental of said space. Ordinarily it is necessary to leave a sizable amount of space unoccupied in order to enable the vehicles to maneuver to and from their places of storage and the entrance to or exit from each floor.

However, this notwithstanding, in a great many instances, the space thus made available for steering and turning movements of the vehicles is relatively limited and makes it necessary to execute a number of movements and turns which considerably delay the final placement of a vehicle in its stall or its removal therefrom. These conditions also severely tax the skill of the ordinary driver and are the direct cause of numerous accidents and mishaps which happen within garages, resulting in damages to vehicles stored therein, and materially increasing the total cost of the operation of the garage.

Various arrangements have heretofore been proposed for increasing the safety and speed of internal traffic in garages, but in many cases the arrangements proposed entail the construction of special buildings and floors, or else they entail material changes in the structure of existing buildings.

By virtue of my present invention, it is possible to install a thoroughly efficient and practical system for handling vehicles in existing garages, without altering their structure and without making installations of prohibitive cost.

Some of the arrangements heretofore proposed, entail the use of a traveling carrier provided with a turn table, said turn table being adapted to receive a vehicle and to turn it around in any desired direction.

An arrangement of this type, for instance, has been described and claimed by me in an application for patent, entitled Traveling turn table, Ser. No. 226,756, copending herewith. Such an arrangement is particularly suitable for such cases where the carrier is made to travel along a trackway directly opposite the entrance to or exit from the garage floor.

In some cases however, the size and shape of the garage floor are such as to make it desirable to use a different arrangement, where the runway provided for the carrier or carriers is not in line with the entrance or exit.

My present invention is particularly suitable for use in such cases, where the use of costly mechanical installations should be avoided.

The annexed drawings illustrate a few typical embodiments of my invention, and a better understanding of the same will be had by referring to said drawings, in which.

My invention comprises, essentially, carrier means adapted to transport vehicles from one point of a garage floor to another, and means cooperating with but independent of said carrier means for setting the vehicles thus handled in a proper direction with respect to the floor entrance or to the storage space which they are expected to occupy; said carrier means being in the nature of a carriage comprising a vehicle supporting platform, said carriage being preferably running on or suspended from rails guiding said carriage along its travel.

Figure 1:
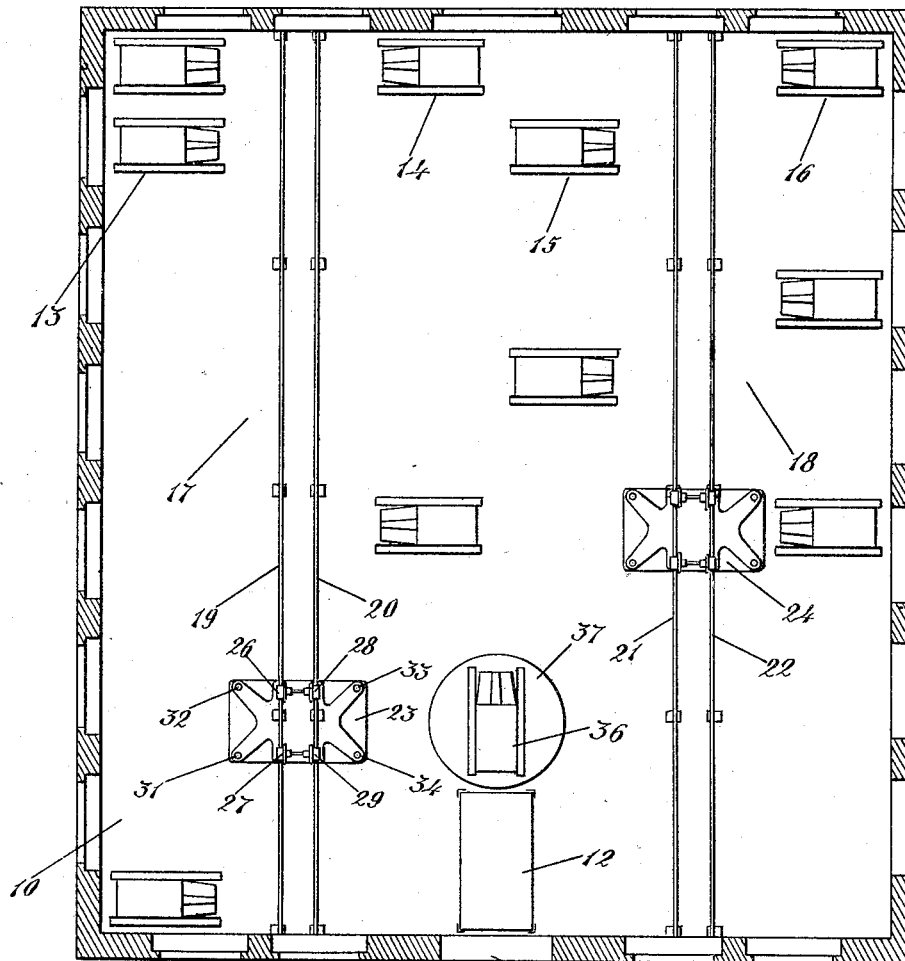
Fig. 1 is a plan view of a garage floor provided with an arrangement of vehicle handling means coming within the scope of my invention.
Figure 3:
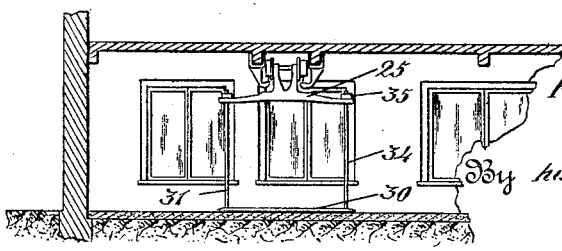
Fig. 3 is a cross view in elevation of the floor illustrated in Fig. 1.

In the arrangement illustrated in Figs. 1 and 3, 10 designates a garage floor provided with an entrance 11, and served by an elevator 12 adapted for vertical travel directly opposite said entrance.

The garage floor is of a width sufficient for accommodating four longitudinal rows of vehicles 13, 14, 15, 16, said vehicles being arranged with their axis, transversely directed in relation to the direction in which vehicles may enter or leave the floor.

Longitudinal rows of vehicles 13, 14 are served by a runway 17 intermediate therebetween and in a similar manner, longitudinal rows of vehicles 15, 16 are served by a runway 18 running from the front to the rear of the floor.

Each runway is provided with an overhead track comprising two rails 19—20, 21—22; and a carrier 23, 24, is suspended from each track.

Each carrier comprises a frame 25 suspended from four wheels 26—27, 28—29, running on rails 19—20, 21—22. A platform 30 adapted to receive a vehicle transversely directed in relation to entrance 11 is suspended from said frame by means of four uprights 31, 32, 33, 34, said platform being held at but a slight distance from the floor, just enough to permit the carrier to freely travel from one end of the floor to the other.

To this end, the distance between the platform and the frame is preferably made adjustable in any suitable manner, for instance, by threading the upper end of uprights 31, 32, 33, 34 and causing axial adjustment thereof, by means of nuts such as 35.

A vehicle 36 will enter or leave the ground floor of the garage through entrance 11 with its axis in a longitudinal direction; therefore, the vehicle will also be longitudinally directed when getting on or off the platform of elevator 12.

In order to change the direction of the vehicles discharged from the elevator platform onto one of the floors, or being driven on the platform from said floor, I install a turn table 37 on each floor, directly in line with the elevator platform, so that an incoming vehicle upon leaving the elevator platform will be directly driven on the opposite turn table without changing its direction, as Fig. 1 shows.

At this stage, the carrier serving the storage space where the vehicle is to be placed is brought directly in line with turn table 37, as shown in connection with carrier 23 in Fig. 1.

The turn table is then rotated 90° in the proper direction, thus setting the vehicle at right angle to its previous direction. The vehicle can then be driven directly into platform 30 on its own power and then the carrier is made to travel along its track until the space in front of the desired storage space or stall is reached; and the vehicle can then once more be driven on its own power off the platform and into its storage space.

The reverse takes place when a vehicle is to be moved from its stall onto the elevator's platform. The movement of the carriers may be effected by hand, or else suitable propelling means may be provided if desired.

It will be observed that with the arrangement described, carriers of a very simple type can be used, as well as turn tables of a stationary character which can be easily installed at any convenient point on the floors. In another patent application for means for handling and storing motor vehicles, Ser. No. 226,757 copending herewith, I have described a type of suspended carrier which may be used for handling the traffic of incoming and outgoing vehicles on garage floors, said carrier being both adapted to travel along a trackway and being also rotatable about a vertical pivot so as to change the direction of its platform and of a vericle carried thereby.

Such a construction however is somewhat more complicated and less rigid than the one just described, and furthermore, it is not suitable for use in some cases where the ceiling is exceptionally low; therefore, in such cases, the arrangement forming the object of the present invention may be preferable, especially on account of its simplicity and low cost.

The arrangement forming the object of the present invention is also more suitable in such cases, where it is not convenient to place the runway for the carrier directly opposite the elevator or the entrance to the floor; because, it is obvious that in such cases, it becomes necessary to change the direction of the vehicles at some point between the elevator's platform or the entrance and the carrier's platform.

Figure 2:
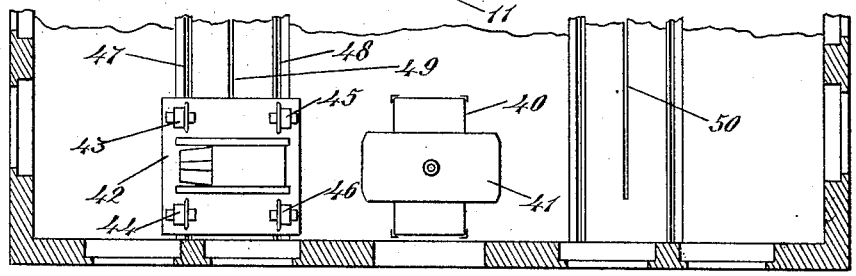
Fig. 2 is a fragmentary plan view of a similar floor illustrating a somewhat different arrangement of turn table.

In Fig. 2, I illustrate another arrangement where the turn table is mounted directly on top of the elevator's platform, as advocated in another patent application entitled, Means for distributing vehicles in garages, Ser. No. 226,775 copending herewith.

In said arrangement, 40 designates the elevator's platform, and 41 a turn table mounted directly on said platform adapted to turn a vehicle carried thereby 90° to the right or to the left as shown.

By virtue of this arrangement, once the elevator has reached the proper floor, the turn table is rotated and the vehicle is driven on its own power off said turn table and onto the platform of the carrier opposite.

Said drawing also illustrates a different type of carrier which may be used in order to carry out my inventive idea in a different way, said carrier comprising a platform 42 provided with four wheels 43—44, 45—46, running on floor tracks 47, 48. Said wheels are carried by shafts mounted above platform 42 and project but slightly underneath said platform, just enough to hold the platform at a slight distance from the floor.

By virtue of this construction, it is possible to provide the platform with wheels of suitable diameter and strength, at the same time maintaining the platform close to the floor where it is easy for a vehicle to get on or off said platform.

A carrier of this general character has been described and claimed by me in another patent application, entitled Traveling turn table, Ser. No. 226,756 copending herewith, with the difference that the carrier therein described in its preferred form, also comprises a turn table mounted directly on the platform.

The carrier shown in Fig. 2 of the drawings pertaining to this application is of a somewhat simpler construction and furthermore is more suitable for use in certain cases for the reasons stated in connection with the arrangement of Fig. 1.

Both of the arrangements described, can be easily installed on existing floors, since they do not entail material changes in or addition to the building structure.

It will be understood that the drawings are intended for illustrative purposes only and not in a limiting sense, since it is obvious that the specific details of any arrangement to be adopted will be largely dependent upon existing conditions such as size and shape of the garage floors, location of entrance and exits, etc.

Although no means for the mechanical operation of the carriers are shown, it is obvious, as stated, that any suitable operating means be used and as an illustration, in Fig. 2 I show a slot 49, 50, running between the two tracks of each trackway, adapted to accommodate a cable drive for each carrier.

In view of the above, I reserve myself the right to carry my invention into practice in all those ways and manners which may enter, fairly, into the scope of the appended claims.

I claim:

1. In a building for the purpose described the combination, with a storage room, of a trackway running close to the ceiling thereof, a carrier comprising a wheeled structure running along said trackway, and an elongated vehicle supporting platform depending from said structure, said platform being parallel to and in close proximity to the surface of the floor of said room and being permanently disposed transversely of the direction of travel of said wheeled structure, and a turn table independent of said carrier, adapted to change the direction of a vehicle to be driven on or off said platform.

2. In a building for the purpose described the combination, with a storage room, of a trackway running close to the ceiling thereof, a carrier comprising a wheeled structure running along said trackway, and an elongated vehicle supporting platform depending from said structure, said platform being parallel to and in close proximity to the surface of the floor of said room and being permanently disposed transversely of the direction of travel of said wheeled structure, and a turn table independent of said carrier, adapted to change the direction of a vehicle to be driven on or off said platform, said turn table being mounted at one side of the path of travel of said carrier.

3. In a building for the purpose described, a storage room having an entrance through one of its walls, a trackway running close to the ceiling of said room, a carrier comprising a wheeled structure running along said trackway, and an elongated vehicle supporting platform depending from said structure, said platform being parallel to and in close proximity to the surface of the floor of said room and being permanently disposed transversely of the direction of travel of said wheeled structure, and a turn table independent of said carrier mounted within said room opposite said entrance.

4. In a building for the purpose described, a storage room having an entrance through one of its walls, a trackway running close to the ceiling of said room, a carrier comprising a wheeled structure running along said trackway, and an elongated vehicle supporting platform depending from said structure, said platform being parallel to and in close proximity to the surface of the floor of said room and being permanently disposed transversely of the direction of travel of said wheeled structure, and a turn table independent of said carrier mounted within said room opposite said entrance, said trackway being displaced laterally of said entrance and said turn table and being arranged at right angle to said entrance wall.

5. In a building for the purpose described, a storage room having an entrance through one of its walls, a trackway running close to the ceiling of said room, a carrier comprising a wheeled structure running along said trackway, and an elongated vehicle supporting platform depending from said structure, said platform being parallel to and in close proximity to the surface of the floor of said room and being permanently disposed transversely of the direction of travel of said wheeled structure, a turn table independent of said carrier mounted within said room opposite said entrance, said trackway being displaced laterally of said entrance and said turn table and being arranged at right angle to said entrance wall, and a car storage space along both sides of the path of travel of said carrier.

GOTHARD LOWENSTEIN.